Sept. 12, 1967  G. B. HOLMES ETAL  3,340,882
COIN PACKAGING MACHINE
Filed Sept. 26, 1963  9 Sheets-Sheet 3
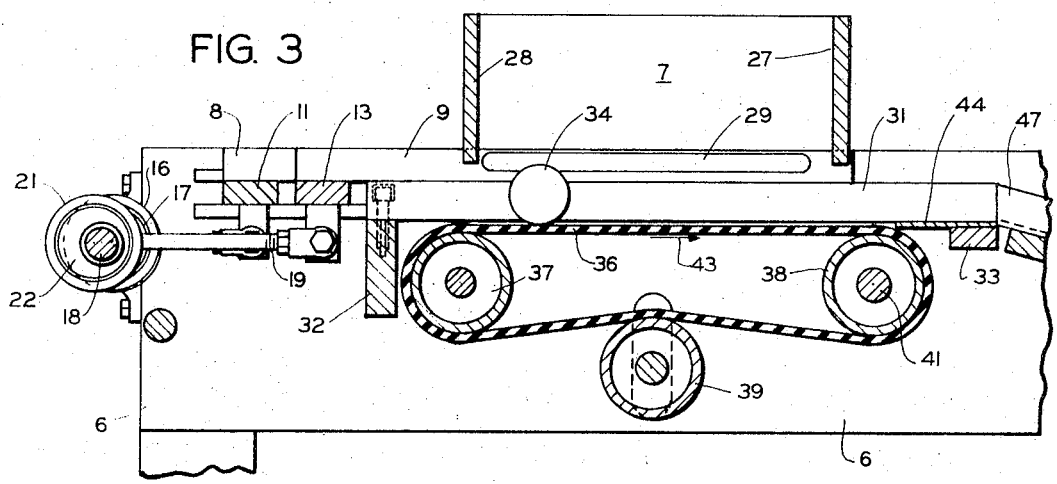
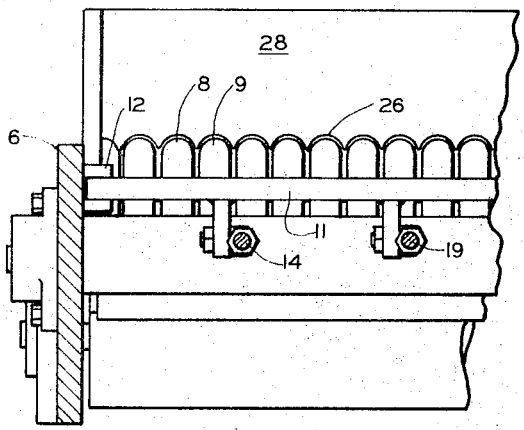
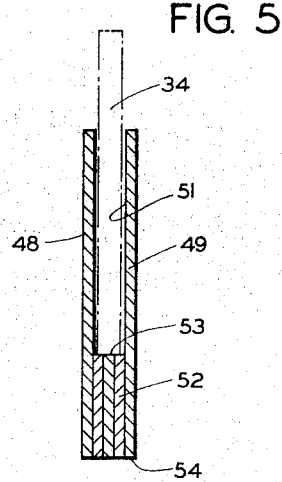
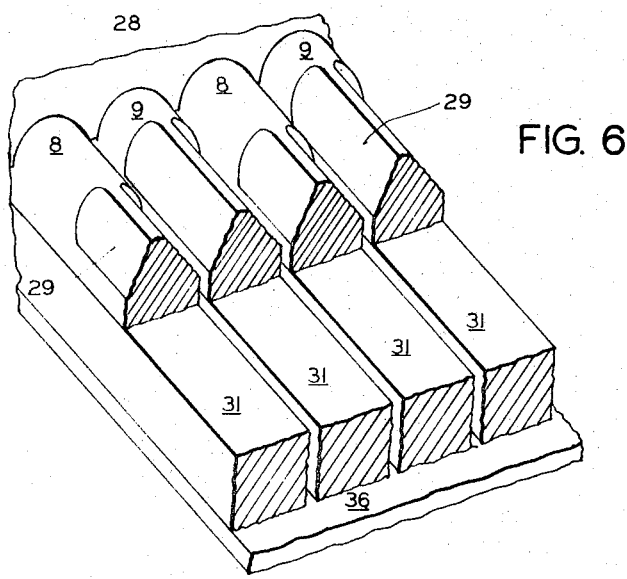
INVENTORS
GEORGE B. HOLMES
GEORGE H. WARFEL
BY
Boyken, Mohler & Foster
ATTORNEYS Sept. 12, 1967 G. B. HOLMES ETAL 3,340,882
COIN PACKAGING MACHINE
Filed Sept. 26, 1963 9 Sheets-Sheet 4

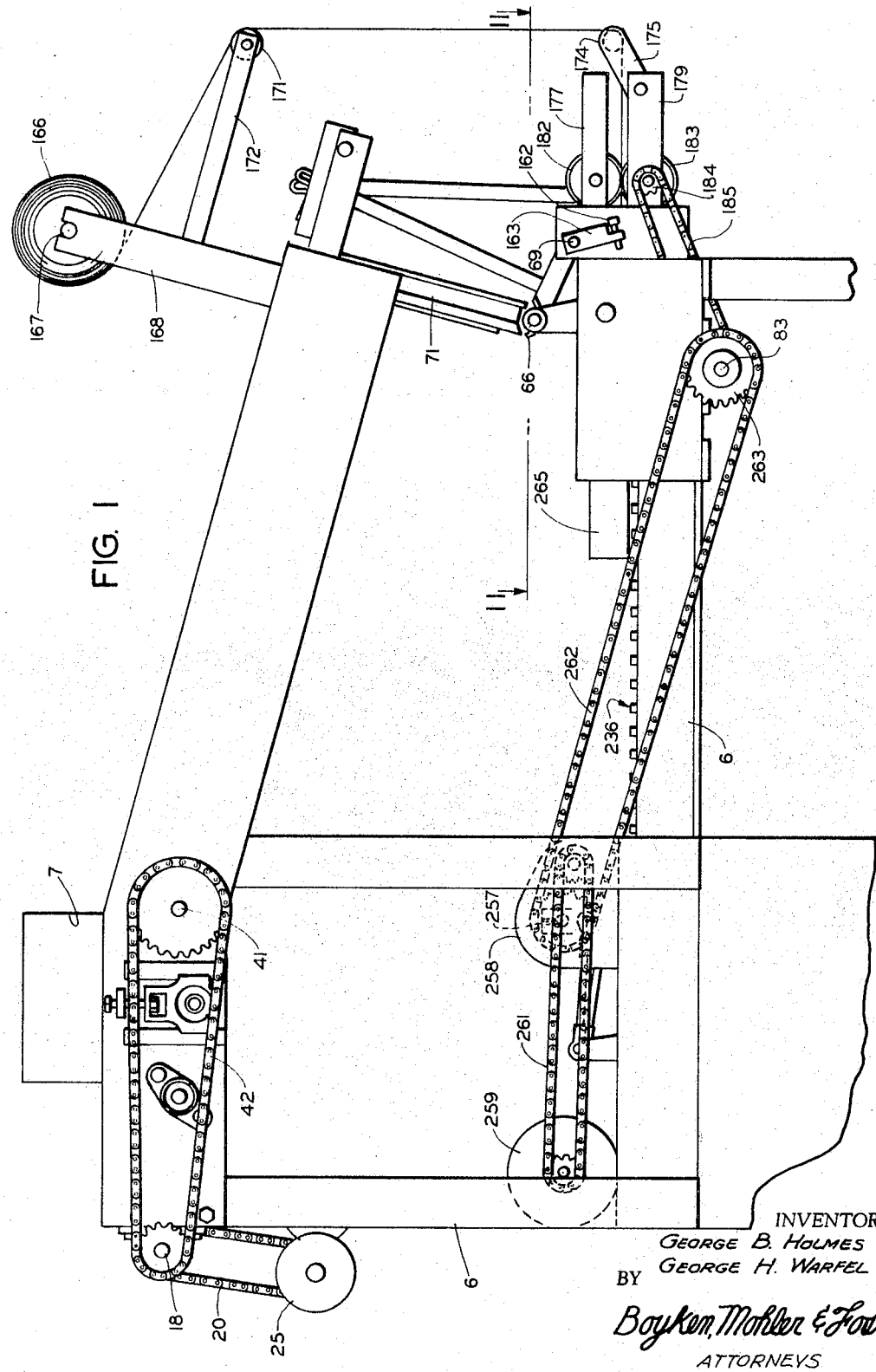

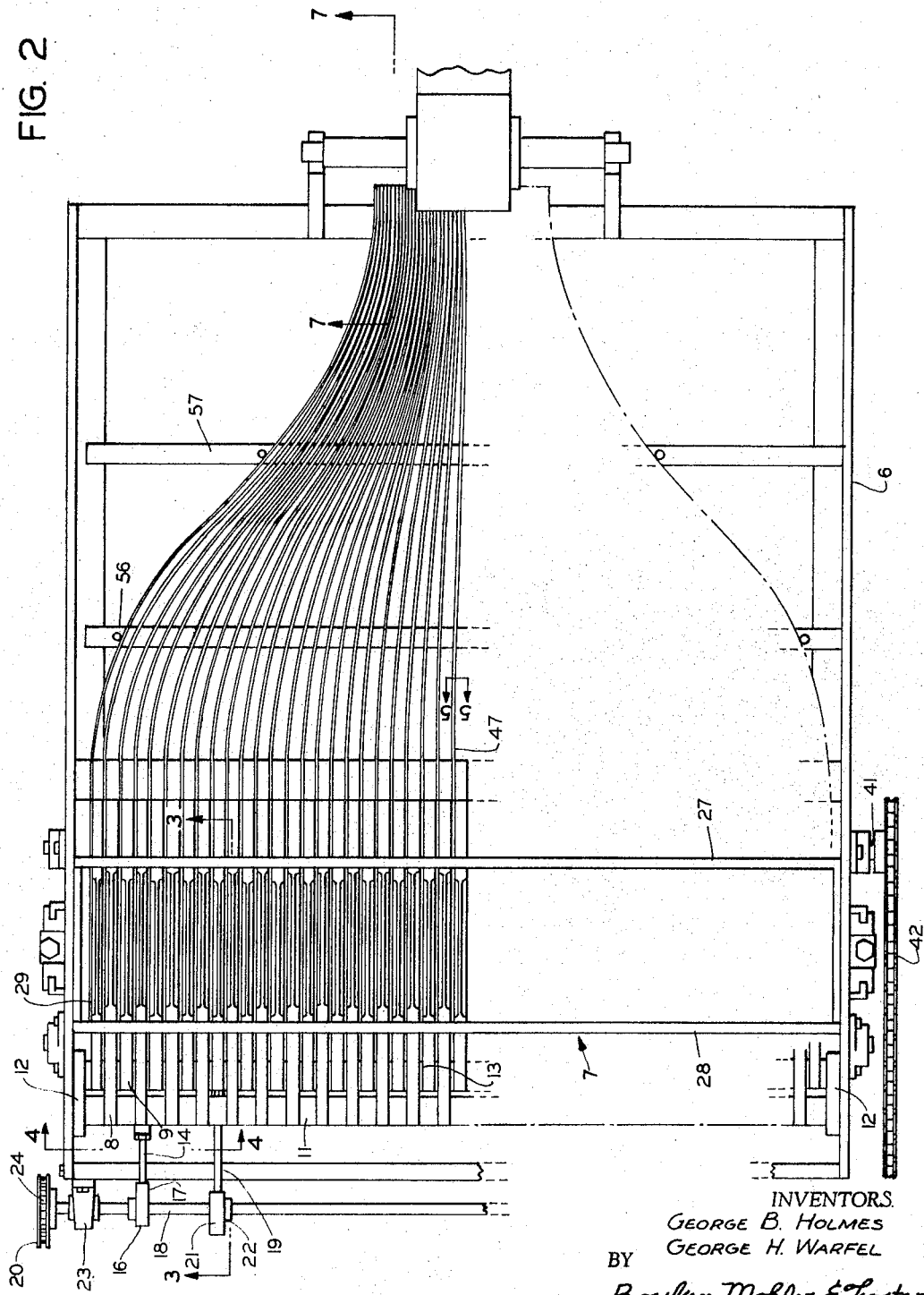

INVENTORS.
GEORGE B. HOLMES
GEORGE H. WARFEL
BY
Boyken, Mohler & Foster
ATTORNEYS Sept. 12, 1967  G. B. HOLMES ETAL  3,340,882
COIN PACKAGING MACHINE Filed Sept. 26, 1963  9 Sheets-Sheet 5

INVENTORS
GEORGE B. HOLMES
GEORGE H. WARFEL
BY
Boyken, Mohler & Foster
INVENTORS INVENTORS.
GEORGE B. HOLMES
GEORGE H. WARFEL
BY
Boyken, Mohler & Foster
ATTORNEYS

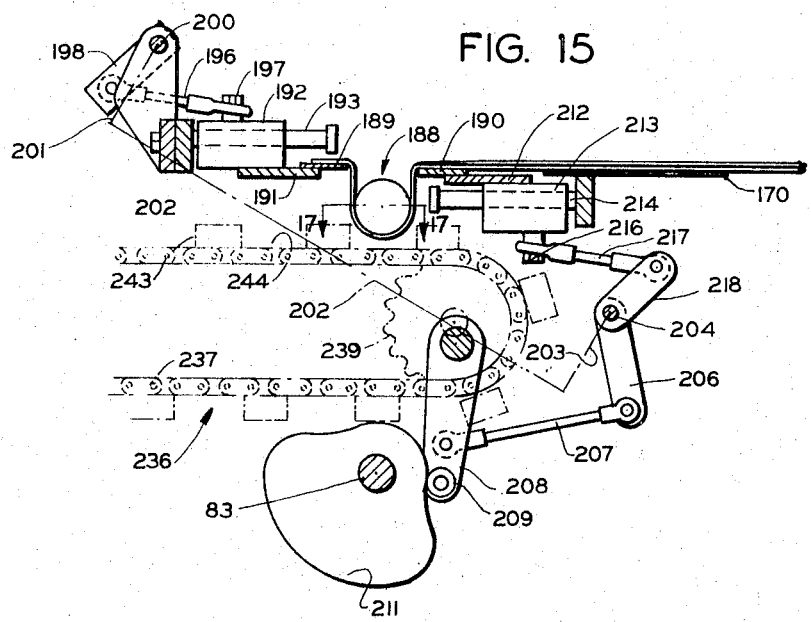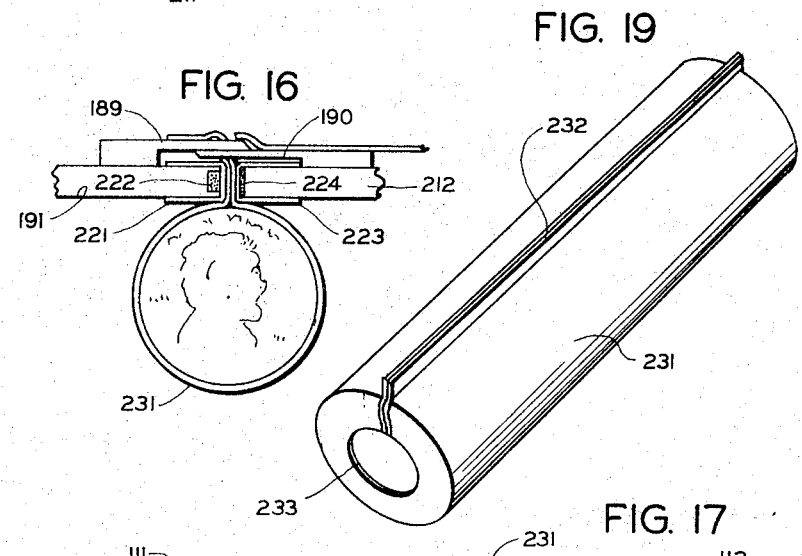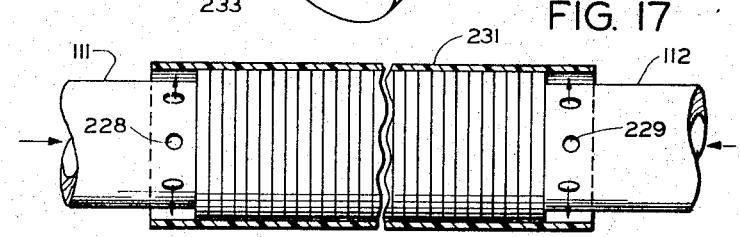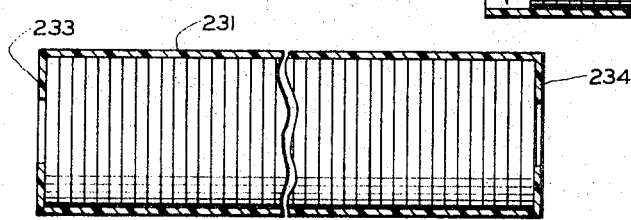

Sept. 12, 1967  G. B. HOLMES ET AL  3,340,882
COIN PACKAGING MACHINE

Filed Sept. 26, 1963  9 Sheets-Sheet 8

FIG. 20

INVENTORS.
GEORGE B. HOLMES
GEORGE H. WARFEL
BY
Boyken, Mohler & Foster
ATTORNEYS United States Patent Office 3,340,882
Patented Sept. 12, 1967

3,340,882
COIN PACKAGING MACHINE
George B. Holmes, Oakland, and George H. Warfel, Menlo Park, Calif., assignors to Bank of America National Trust and Savings Association, San Francisco, Calif., an association of California
Filed Sept. 26, 1963, Ser. No. 311,835
4 Claims. (Cl. 133—1)

This invention relates to means for taking coins of a particular denomination arranged at random and then rearranging the coins in a selected order and in a predetermined number to form a coin body and finally wrapping or enfolding the body of coins as a unit.

In many places handling a large number of coins of varying denominations, there are machines for automatically segregating the coins into different groups, each containing coins all of one denomination. For convenience, it is customary to package a group of coins of a predetermined number, say, fifty, in a body which is enclosed and wrapped for protection of the coins and of the handlers and for storing and stacking. It is an object of the present invention to provide a machine for arranging a predetermined number of coins in a body and then packaging the coin body.

Another object of the invention is to provide a machine for accepting coins of one denomination but in random array and in indeterminate number and for taking those coins and arranging them in predetermined numbers and in a preselected array for wrapping and packaging.

Another object of the invention is to provide a machine which will automatically arrange a predetermined number of randomly arranged coins in an enclosure sealed against coin dislodgment.

Another object of the invention is to provide a machine which will enfold a selected number of arranged or ordered coins in a transparent package so that the coins can be inspected without disrupting the package.

Another object of the invention is to provide a machine for automatically enfolding a body of coins in a package sealed not only longitudinally of the package but on the ends as well.

Another object of the invention is to provide an automatic machine for receiving coins in random numbers and in random array and for subsequently discharging packages, each containing a predetermined number of the coins arranged in a regular array.

Another object of the invention is in general to improve coin packaging machines.

Other objects together with the foregoing are attained in the embodiment of the invention described in the accompanying description and illustrated in the accompanying drawings, in which:

FIG. 1 is a side elevation of a machine constructed in accordance with the invention;

FIG. 2 is a plan of the major portion of the machine shown in FIG. 1, parts being broken away to reduce the size of the figure;

FIG. 3 is a detail cross section to an enlarged scale, the plane of section being indicated by the line 3—3 of FIG. 2;

FIG. 4 is a cross section to the scale of FIG. 3, the plane of section being indicated by the line 4—4 of FIG. 2;

FIG. 5 is a cross section in detail and to an enlarged scale of coin channel, the plane of section being indicated by the line 5—5 of FIG. 2;

FIG. 6 is a perspective view of a portion of the orienting bar arrangement;

FIG. 15 is a cross section, the plane of which is indicated by the line 15—15 of FIG. 11;

FIG. 16 is a cross section to an enlarged scale on the same plane as that of FIG. 15, but showing the sealing and cutting mechanism;

FIG. 17 is a cross section, the plane of which is indicated by the line 17—17 of FIG. 15;

FIG. 18 is a view similar to FIG. 17, but showing the complete coin package;

FIG. 19 is an isometric showing a completed coin package;

FIG. 20 is a perspective showing a portion of the machine especially including a drive for the discharge conveyor.

Figure 7:
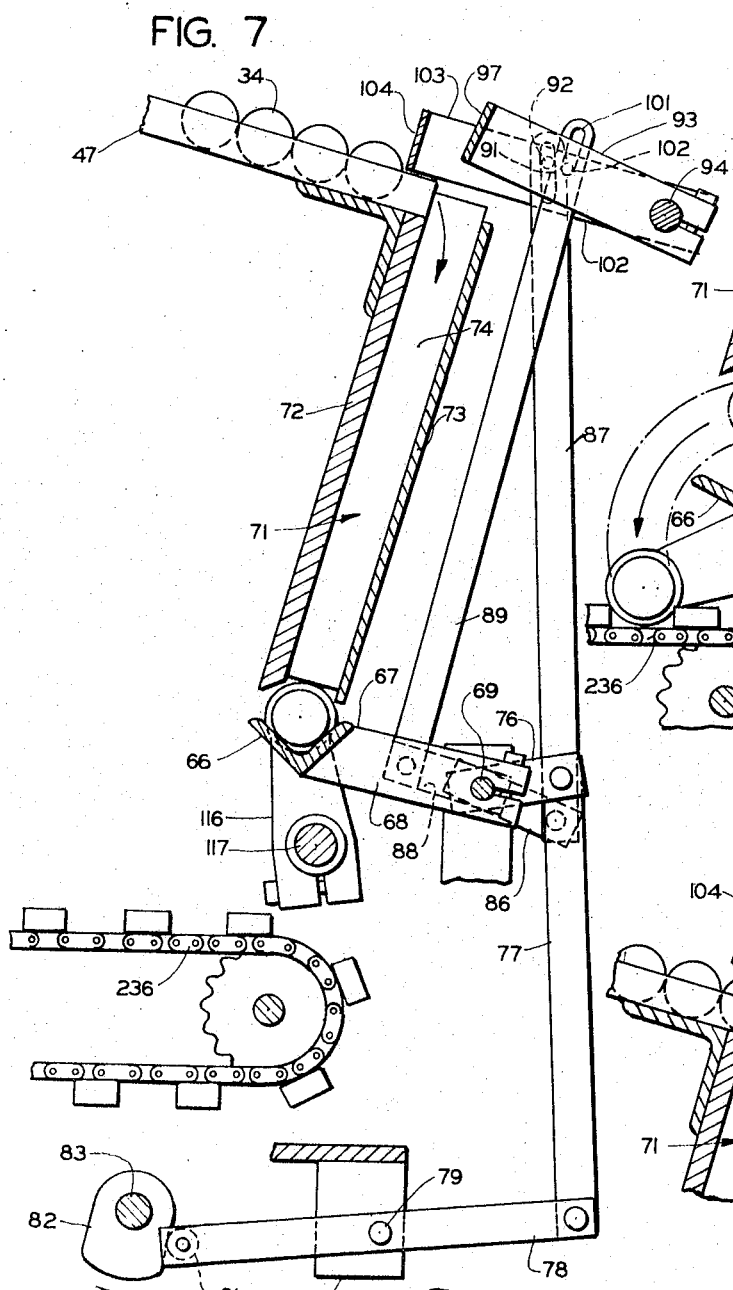
FIG. 7 is a cross section of a portion of the mechanism, the plane of section being indicated by the line 7—7 of FIG. 2.

In its preferred form, the coin packaging machine includes a main frame 6 (FIG. 1) made up of structural angles and shapes assembled to provide an appropriate support for the cooperating elements of the device. At the top of the frame adjacent the feeding end of the machine, there is provided a receiving hopper 7 (FIGS. 1, 3). This is a generally elongated, rectangular enclosure open at its top and bottom and is supported stationarily in a convenient position to receive coins. These coins are those which have previously been sorted so that they are all of the same denomination, but they are dumped into the hopper in a random fashion and are not only variable in quantity, but are disposed in heterogeneous array.

In order to arrange the coins in a selected order and also to select a predetermined number of the coins, there is mounted on the frame a number of orienting bars 8 and 9 (FIGS. 2, 3). These bars generally similar and are disposed largely beneath the hopper. They are interspersed so that alternate bars operate in unison and the interventing bars operate also in unison but out of phase with the first bars. To that end, the bars 8 of one group are secured at one end to a cross member 11 mounted for rectilinear oscillation in guide blocks 12 at the opposite sides of the machine (FIGS. 2, 4). Since the structure is largely symmetrical about a longitudinal center line, the description of the construction on one side of the center applies equally to the construction on the other. Comparably, the bars 9 of the other group are secured to a cross member 13 likewise slidably reciprocable in the guide blocks 12.

The cross member 11 is provided with adjustable connecting rods 14 joined to eccentric straps 16 journalled on eccentrics 17 fast on a rotatable drive shaft 18. Similarly, the cross member 13 is adjustably joined by rods 19 to eccentric straps 21 on eccentrics 22 likewise fast on the cross shaft 18 but disposed one hundred eighty degrees out of phase with the eccentrics 17. The shaft 18 is mounted in journal blocks 23 secured to the frame 6 and is provided with a sprocket 24 connected by chain 20 to motor 25, so that when the shaft 18 is rotated by motor 25, the eccentric straps 16 and 21 are comparably rotated and through the connectors 14 and 19 oscillate the two groups of orienting bars 8 and 9 in opposite phase to each other.

The orienting bars themselves are preferably constructed as shown particularly in FIG. 4. All of the bars are substantially identical, although differing slightly in length between the two groups. Each bar is a relatively hard plastic strip having parallel flat sides, rounded on its upper face and flat on its lower face. The bars are interfitted on their curved upper portions with scalloped cutouts 26 in the front wall 27 and the back wall 28 of the hopper 7, so that there is only sliding clearance therebetween. Between walls 27, 28, bars 8, 9 are formed on both sides with flats 29 (FIGS. 3, 6) sloping from the curved upper face to the side of the bar.

The bars are supported from below. They rest on a plurality of coplanar, parallel, support rails 31 at their opposite ends appropriately secured to cross members 32 and 33 of the frame 6. The rails 31 as well as the bars 8 and 9 are not disposed in immediate lateral contact with each other. Rather, they are spaced apart laterally a distance slightly greater than the maximum thickness of the coins to be accommodated. The dimensions of the parts are such that a representative coin 34 (FIG. 3) resides easily between the adjacent bars and rails but does not extend so high as to interfere with the lower edge of the front portion 27 of the hopper.

The bottom of this part of the structure is largely formed by a conveyor belt 36 trained around a pair of drum rollers 37 and 38 and maintained in taut condition by an adjustable idler roller 39. Preferably, the drive is transmitted from the shaft 18 to a shaft 41 for the roller 38 by means of a chain 42 (FIG. 1) so that the driven portions of the feeding part of the machine are all operated in synchronism.

In the operation of this part of the structure, the random number of coins randomly dumped into the hopper is agitated and fed by the orienting bars and the belt 36 until various of the coins move by chance over the rounded upper portions and slantingly down flats 29 of the orienting bars 8, 9 and are gradually moved and shaken into vertical attitudes in single file in the vertically aligned spaces between the adjacent orienting bars and the adjacent rails 31. The net result is that various coins from the random charge are individually disposed in an upright attitude resting on the belt 36 and available for advancement by the advancement of the belt 36 in the direction of the arrow 43 (FIG. 3) to pass beneath the forward wall 27 of the hopper 7. Since in most instances it is desired to handle the coins in groups of even multiples of the coin value (such as fifty pennies), it is customary to provide at least such number of spaces intervening between the parallel orienting bars, thus constituting fifty active coin slots in the instance illustrated where the machine is adapted for packaging pennies.

During the operation of the device, a single file of coins is transported from the loading hopper in each one of the fifty coin slots and travels from the belt 36 over a transition section 44 to a plurality of coin channels 47. The coin channels, except for length, are substantially identical and are particularly constructed as shown in FIG. 5. Each of the coin channels comprises a pair of vertically oriented, flat, flexible metal strips 48 and 49 spaced apart to provide a coin path 51 slightly wider than the coins to be handled. The strips 48 and 49 at their bottom embrace some intermediate shims 52 to afford a supporting surface 53. A suitable seal and adhesive 54 holds the assembly together.

The individual coin channels are mounted on appropriate cross members 56 and 57 on the frame (FIG. 2) and at one end are arranged in direct alignment with the coin slots between the successive orienting bars 8, 9 so as to constitute smooth continuations thereof. Yet, the sundry coin channels are sloped and contoured and bent, for the most part, so as to be brought more closely together in order to begin an approaching, assembly movement of the various files of coins looking toward the formation of a compact coin body. The coin channels 47 slope downwardly away from the feeding end of the machine so that coins, once arranged and released from the hopper 7 and moved over the intervening member 44, are impelled by gravity to roll down the individual channels toward the packaging end of the machine, to the right in FIG. 2. By virtue of the inclination of the coin channels, all of the coins roll toward the lower end thereof.

Means to be described are particularly provided for selectively releasing a predetermined number of coins simultaneously from each one of the parallel coin channels. While any selected number can be simultaneously released from each channel, in the present instance the arrangement is such that a single coin is simultaneously released from each channel, thus releasing fifty coins transversely of the device. The purpose of releasing the individual coins singly from each of the channels simultaneously is to transport a predetermined mumber of the coins to a coin trough 66 (FIG. 7).

The coin trough is a section of angle iron 67 mounted on an operating cradle 68 rotatable about the axis of a cross shaft 69 mounted on the frame.

Leading from the discharge end of each of the coin channels to the coin trough is a duct 71 comprised of a backing plate 72 suspended from the frame substantially at a right angle to the various coin channels and a closure plate 73 spaced therefrom by intervening separating walls 74. The walls 74 at their upper ends generally align with the outermost of the barriers defining the individual coin channels but converge even more from the top toward the bottom, so that coins flowing from the individual channels travel downwardly by gravity, being confined laterally in all directions but converging toward a final position on the coin trough 66.

Figure 8:
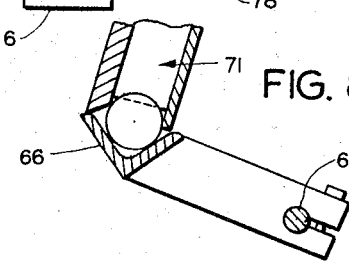
FIG. 8 is a fragmentary detail of a portion of the coin trough as shown in FIG. 7 but in a different position.

The shaft 69 is partially rotated or oscillated and is provided with a radial arm 76 (FIG. 21) for that purpose. A link 77 connects the end of the arm 76 to a cam lever 78. Cam lever 78 is mounted to frame 6 with a pivotal mounting 79 and extends to carry a roller follower 81 (FIG. 7) in abutment with an actuating cam 82 on a cross cam shaft 83 (FIG. 11) which is appropriately driven in the direction shown by the arrow below the cam in FIG. 7. As the cam 82 revolves, the lever 78 is oscillated and through the link 77 correspondingly oscillates the coin trough 66. This coin trough moves from an upper position as shown in FIG. 8 through an intermediate position as shown in FIG. 7 into a lowermost position shown in FIG. 10.

The cam 82 is also utilized to actuate a releasing mechanism for the coins in the various coin channels. Extending from the shaft 69 in one direction is a radial arm 86 having a link 87 connected thereto, while extending in the opposite direction from the shaft 69 is a radial arm 88 having a similar link 89 pivoted thereto. At their upper ends the links are similarly employed. That is, the link 87 has a slot 91 at its upper end encompassing a pin 92 projecting from one side of a barrier bail 103 designed to oscillate on a cross shaft 94 journalled in extensions 96 (FIG. 21) of the main frame 6. The bail includes not only its two side arms, but also a transverse barrier wall 104 of sufficient length to extend across the open, lower ends of all of the fifty coin channels. Comparably, but in a slightly different position, the link 89 is provided with a slot 101 riding on a pin 102 projecting from one of the side arms of a control bail 93 likewise freely pivoted on the cross shaft 94 and having a barrier wall 97 of sufficient width to span all of the fifty coin channels, When in its lower position, barrier wall 104 is positioned to engage coin channels 47 near their ends adjacent duct 71. Barrier wall 97 is spaced rearwardly of barrier wall 104 and, in its lower position, covers enough of the entrance to duct 71 to prevent the foremost transverse row of coins from entering said duct.

When the cam 82 rotates, it not only moves the coin trough 66, but it likewise produces opposite rocking motions of the barrier walls 97 and 104. There is some overtravel in this link structure and the slots 91 and 101 allow for it. In the position shown in FIG. 7, the barrier wall 97 has been raised by link 89 to release all of the foremost coins simultaneously from the coin channels to permit them to drop through the duct 71 onto the coin trough 66. As the barrier wall 97 lifts for this purpose, the barrier wall 104 descends immediately behind the foremost coins so as to block or intercept the successive coins and to hold them in position. Thus, one coin at a time is released from each of the coin channels.

Figure 9:
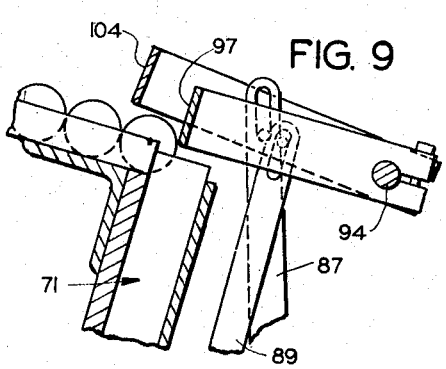
FIG. 9 is a view of the arresting mechanism shown in the upper portion of FIG. 7, but in a different position of operation.

Upon the return motion of the barrier walls 97 and 104, the wall 97 descends into the path of the coins in the coin channels, whereas the barrier wall 104 lifts and gets out of the way of those coins (FIG. 9). The files of coins in each of the coin channels all advance simultaneously the diameter of one coin for each cycle of the machine and are stopped against the barrier wall 97 available for subsequent release. Upon the next cycle, the barrier wall 104 descends to block the succeeding coins, as before, and the ascending barrier wall 97 releases the foremost coins as described. During the operation of the machine, once for each cycle, a group of fifty coins is released, one each from each of the coin channels, to travel and converge through the duct 71 and to stop against the coin trough 66 when that trough is in its uppermost (FIG. 8) position.

The dimensions of the parts are such that the intervening walls 74 extend far enough downwardly toward the coin trough in its uppermost position so that when the coins are lodged on the trough, they are still separated and held upright by the barrier walls, there being enough of the walls 74 so that all of the coins, including the end coins, are supported on both sides.

Means are provided for forcing the group of coins on the coin trough into immediate contact and abutment to constitute a coin body. For this reason, there is provided on the frame 6 a pair of plungers 111 and 112 (FIGS. 11, 13, 17), each of which is like the other. The plungers are hollow rods or tubes and are clamped in bosses 113 and 114, each on a respective one of a pair of operating arms 115 and 116. The arm 115 is fastened for recilinear translation and for partial rotation on a base shaft 117 mounted in journals 118 and 119 on the frame 6, accommodating both rotation and sliding movement. Similarly, the arm 116 is fixed on a sleeve 120 terminating in a flanged collar 121. The arm 116 and the collar 121 are secured together for simultaneous operation and the sleeve 120 is keyed to the shaft 117 so that the sleeve and the shaft always rotate together and so that the sleeve 120 is slidable axially or lengthwise with respect to the shaft 117.

Figure 14:
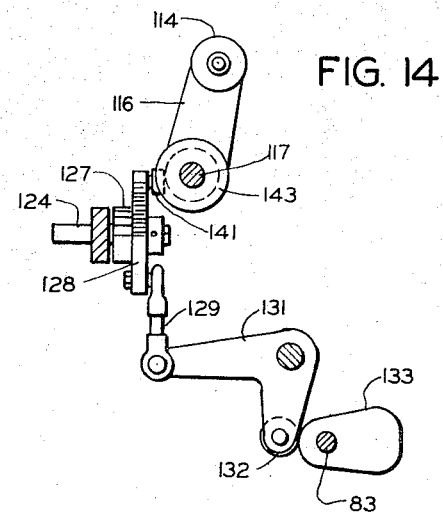
FIG. 14 is a detail showing the appearance of the mechanism when viewed from the plane 14—14 in FIG. 13.

Means are provided for simultaneously oscillating the tubes or plungers 111 and 112 lengthwise by motion in opposite directions. Mounted on the frame are parallel stub shafts 123 and 124. These carry partial gears 126 and 127 in mesh with each other. The gear 127 has an extended arm 128 joined by a link 129 to a rock shaft 131 (FIG. 14). A roller 132 on an arm of the rock shaft 131 rides against an actuating cam 133 on the shaft 83. When the cam 133 revolves, the mechanism is such as to cause the two shafts 123 and 124 to rotate simultaneously in opposite directions. The shaft 123 carries an arm 136 supporting a roller 137 running in a groove 138 of the collar 121 and similarly the shaft 124 carries an arm 139 having a roller 141 riding in the groove 142 of a collar 143 fixed on the shaft 117. Thus, when the shafts 123 and 124 rotate simultaneously in opposite directions, the rollers 137 and 141 concurrently move the collars 121 and 143 to approach each other and to recede from each other and so to move the plungers 111 and 112. The plungers are in their normal, receded position when the coins are first deposited on the coin trough as shown in FIG. 8.

As the coin trough moves from its FIG. 8 position toward its FIG. 7 position, the cam 133 is effective to cause the plungers 111 and 112 to move from their receded position and to approach each other. They are so adjusted as to encounter or abut the end coins on the coin troughs 66 and to move all of those coins into close proximity and into a tight coin body just as the coins are lowered away from the walls 74.

Figure 13:
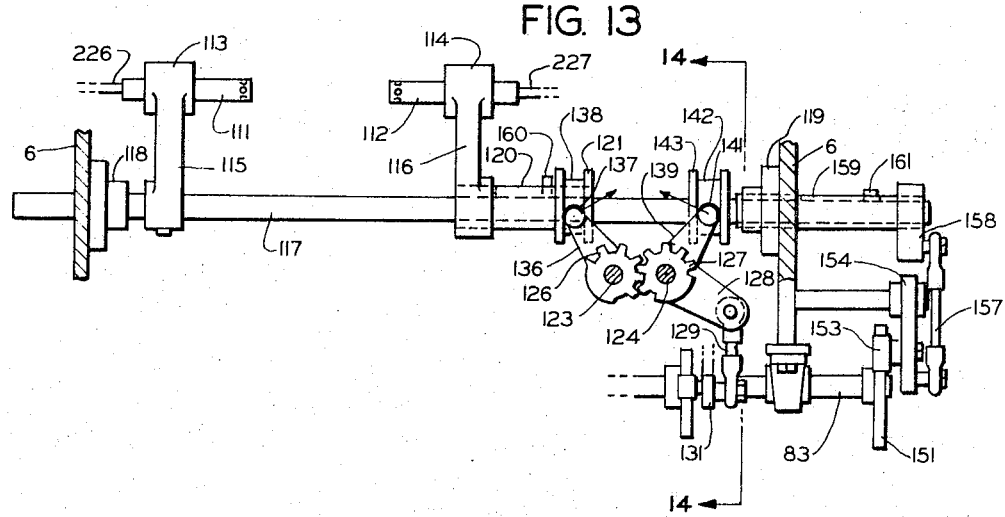
FIG. 13 is an elevation of the coin body gripping mechanism shown in gripping position.
Figure 21:
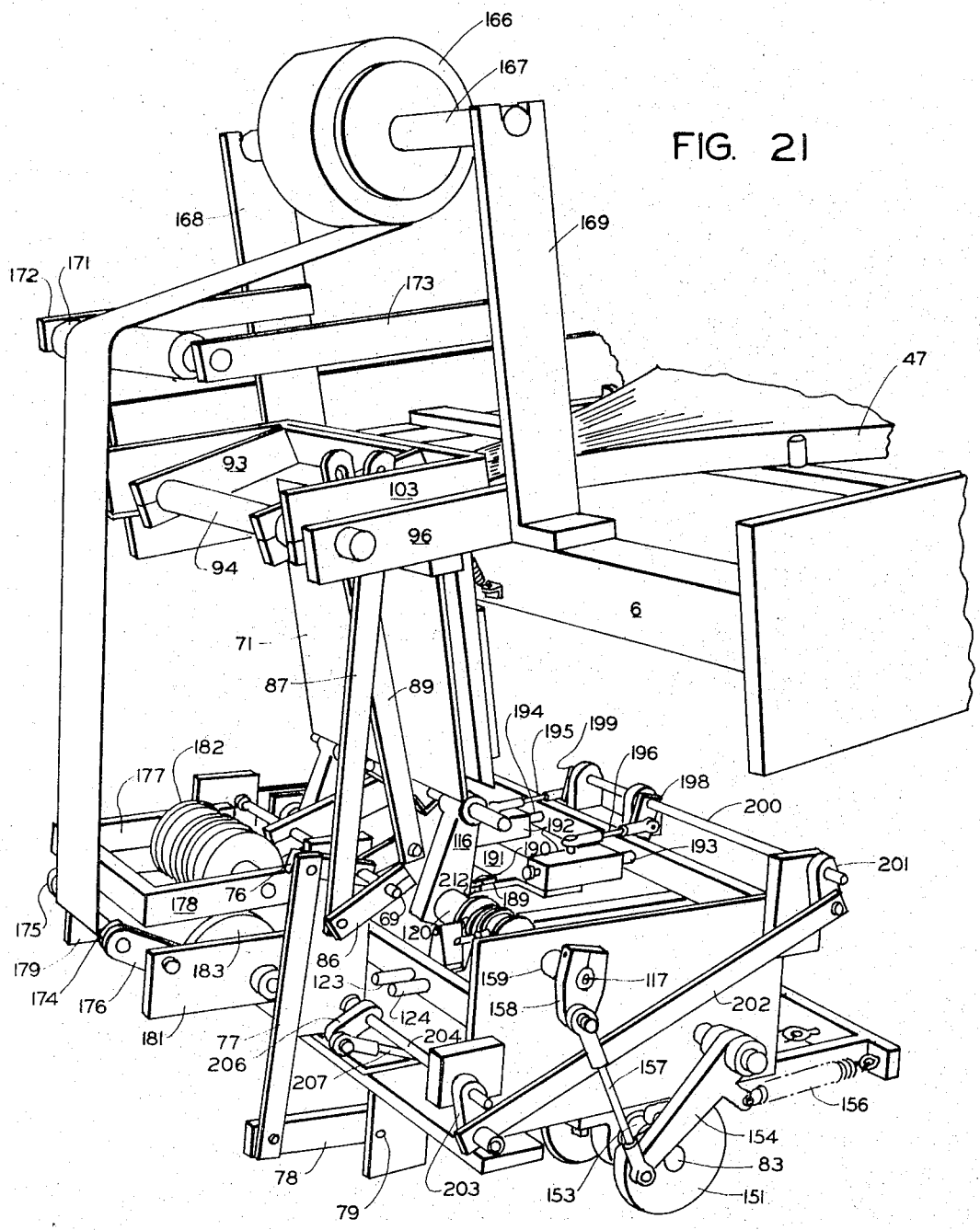
FIG. 21 is a perspective showing a part of the machine especially including the coin packaging mechanism.

At the time the coins are free of the walls, the shaft 117 is rotated by mechanism especially shown in FIG. 13 and in FIG. 21. A cam 151 on the shaft 83 engages a roller 153 on a rocker arm 154 and moves the arm against the urgency of a return spring 156. To the rocker arm 154 is joined a connecting rod 157 also connected to a lever 158 on a sleeve 159 rotatably mounted in the journal 119. The sleeve 159 is connected to the shaft 117 by a key 161 so that the sleeve 159 and the shaft 117 must rotate in unison with each other while the shaft 117 can slide endwise or axially with respect to the sleeve 159, the shaft 117 also engaging the sleeve 120 by a key and slot connection 160. As the cam 151 rotates, at an appropriate time the sleeve 159 is rotated and so the shaft 117 and correspondingly the bosses 113 and 114 and the plungers 111 and 112 are rotated.

Figure 10:
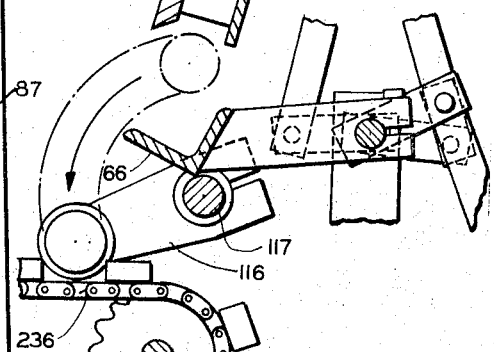
FIG. 10 is a view showing a portion of the coin trough and attendant mechanism as shown in FIG. 7, but a different position of operation.

The tubes 111 and 112 are swung from their initial, engaging position with the coin body as shown in FIG. 7 through intermediate positions and into a final, lower position as shown in FIG. 10. This is substantially a quarter of a circle of rotation for the shaft 117 and moves the coin body into a new location. To accommodate this motion and concurrently to withdraw the coin trough 66 from the gripped and dislodged coin body, the shape of the cam 82 is such as to move the coin trough from its FIG. 7 position into its FIG. 10 position as the coin body is being advanced away from the bottom of the chute 71. The uppermost position of the coin trough 66 is limited by an adjusting screw 162 in a lever 163 on the shaft 69 (FIG. 1).

The result of the operation of the machine to this point has been to provide as an entity a coin body made up of an array of abutting coins all in coaxial order and of a predetermined number. In this instance, there is provided a circular cylindrical coin body or column containing fifty coins, all of the same denomination and gripped together by compressive forces exerted at the body ends by tubes 111, 112.

Pursuant to the invention, means are provided for enclosing or wrapping the coin body so established. It is preferred to wrap the coins in a preferably transparent, limp sheet of heat sensitive and heat shrinking material such as some of the currently available sheet plastics. This material has as a characteristic the ability to bond to itself under heat and pressure and also to shrink when subjected to elevated temperatures.

Disposed on the machine in a convenient position is a roll 166 of sheet or strip wrapping material of the indicated sort (FIGS. 1, 21). The roll is mounted on a readily removable shaft 167 for replenishment and is supported in uprights 168 and 169 (FIG. 21). The wrapping material is led from the roll over an idle roller 171 supported in other extensions 172 and 173 on the frame and then travels over a take-up roller 174 mounted in swing arms 175 and 176 pivotally secured in the lower portion of the machine frame. The roller 174 bears upon the wrapping strip and tends to keep it taut by gravity.

Figure 12:
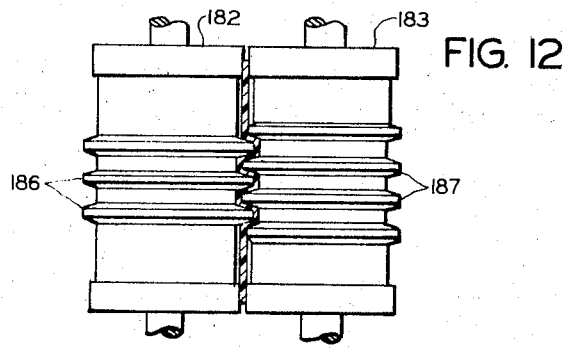
FIG. 12 is a detail showing in elevation the corrugating rolls with the wrapping material being disclosed in cross section, the plane of which is indicated by the line 12—12 of FIG. 11.
Figure 11:
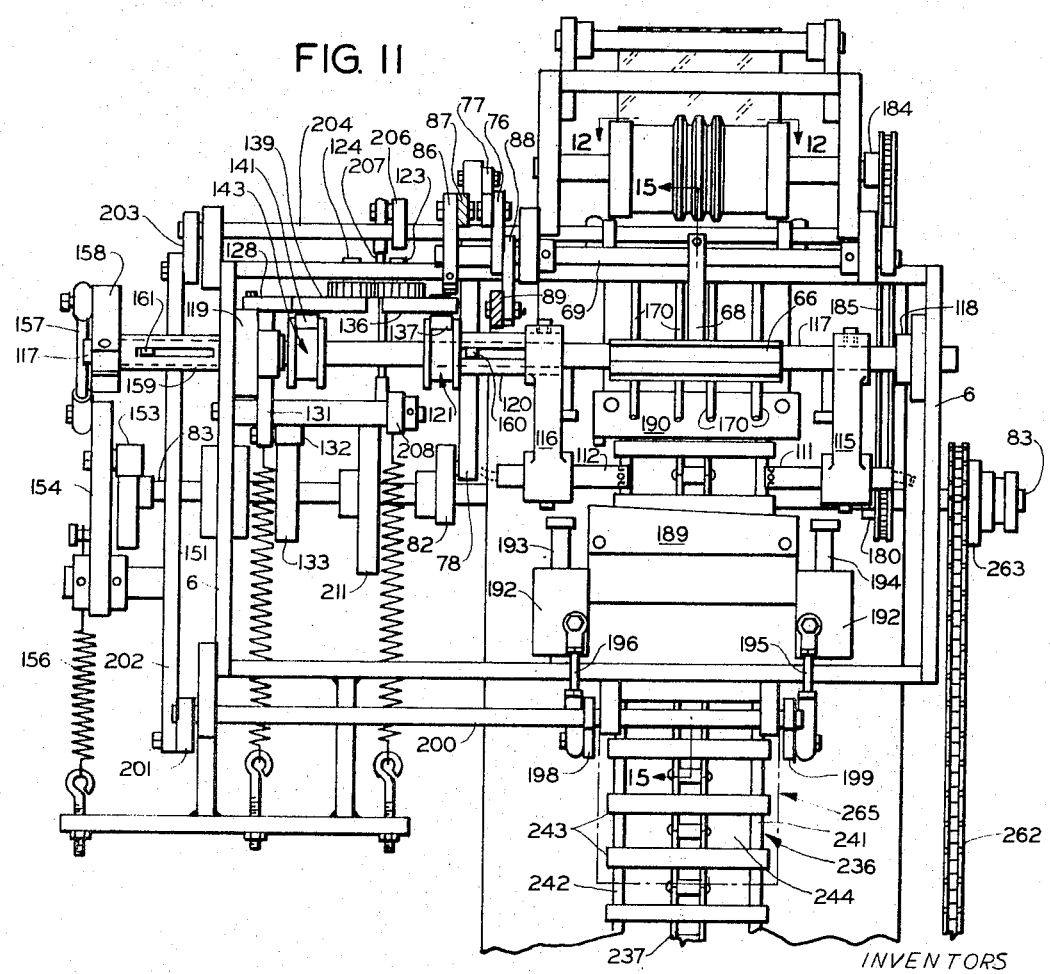
FIG. 11 is a cross section of a portion of the machine, the plane of section being indicated by the line 11—11 of FIG. 1.

Since it is desired to advance the wrapping material by a pressure operation rather than a tension operation (to facilitate wrapping, as will be shown), and since the customary wrapping material is entirely too limp in its ordinary condition for such handling, there is provided means for temporarily corrugating and so stiffening the wrapping material. Suitably mounted in extensions 177 and 178 of the frame and in extensions 179 and 181 of the frame are rollers 182 and 183, respectively (FIGS. 1, 12, 21). The rollers are suitably journalled and the lower roller 183 is provided with a sprocket 184 (FIGS. 1, 11) connected by a chain 185 to a sprocket 180 on the shaft 83. The rollers are provided with ribs 186 and 187, respectively, which intermesh with intervening grooves so that the wrapping strip in passing between them is longitudinally crimped or corrugated to a mild degree, but sufficiently to form at least temporary longitudinal ribs in the wrapping material. This gives it sufficient stiffness so that the rotation of the feed rollers 182 and 183 is effective to advance and project the wrapping material into an operating position when the rollers are appropriately driven. This temporary corrugation of the wrapping material is maintained for a short distance away from rollers 182, 183 by longitudinally extending, staggered guide wires 170 (FIGS. 11, 15).

As the rollers 182 and 183 advance the end of the corrugated wrapping material, they propel it over a gap 188 (FIG. 15) in an enclosing structure. This part of the mechanism includes a pair of knife platens 189 and 190 (FIG. 16). The knife 189 is mounted on a sub-plate 191 carried by a pair of blocks 192 operating on a pair of rods 193 and 194 (FIG. 11) extending from the machine frame. The blocks 192 are reciprocated on the rods 193 and 194 by links 195 and 196 having universal connections 197 to blocks 192. Both of the links 195 and 196 are joined by levers 198 and 199 to a cross shaft 200 journalled in the framework and appropriately driven.

The shaft 200 at one end (FIGS. 11, 15, 21) carries an arm 201 joined by a link 202 to a radial arm 203 on a drive shaft 204. This in turn is suitably journalled and carries a drop arm 206 connected by a rod 207 to a cam follower arm 208 (FIG. 15). A roller 209 on the bottom of the arm 208 follows a cam 211 on the driving shaft 83. Thus, when the cam 211 revolves, the various link mechanisms cause the shaft 200 to oscillate accordingly and cause the advancement and retraction of blocks 192 and correspondingly the advancement and retraction of the upper knife 189.

Similarly, the other knife 190 is disposed on a subplate 212 fastened to blocks 213 reciprocable on suitable rods 214. Universal connections to blocks 213 are provided by loose coupled pins 216 engaging connecting rods 217. Radial arms 218 on the shaft 204 are connected to links 217. The relationship of these parts is such that blocks 213 are reciprocated at the same time as, but in the opposite direction to, blocks 192 so that the upper knife blade 189 and the lower knife blade 190 are approached and caused to pass each other.

These parts are timed or cycled in such a way that the wrapping sheet is fed across the gap 188 when the knife blades are completely separated. The corrugated wrapping normally projects substantially straight across the gap and extends for some distance on the far side thereof. When the wrapping material has been so arranged, then the two hollow tubes 111 and 112 lower the coin body not only against the material extending across the gap, but go further to a lower position therein, as shown in FIG. 15, depressing the material so that the coin body is at least half enveloped in the wrapping material.

At this juncture, special closure and sealing means (FIG. 16) are called into operation. The lower plate 191 at its exposed edge is provided with a fixed channel 221 of Teflon impregnated fiberglass, or the like. This is slightly flexible or yieldable, especially in its central portion, and overlies a resilient filler 222 such as high temperature rubber. Comparably, the lower plate 212 at its leading edge carries a fixed channel 223 (similar to channel 221) overlying a heater wire 224. This latter is connected in a suitable electrical circuit (not shown) and is supplied with sufficient energy to raise the temperature of the channel 223. Channel 223 is interposed between heating wire 224 and the plastic coin wrapping material to prevent the latter from adhering to the former while being heated. Similarly, channel 221 prevents the wrapping material from adhering to the yieldable filler 222.

The timing is such that shortly after the body of coins has been put into its lowermost position as shown in FIG. 15 and is partially enveloped in the wrapping, the two plates 191 and 212 are caused closely to approach each other, thus bringing the sides of the U-shaped wrapping enclosure around the coin body and into close radial abutment with each other. The pressure of the yieldable filler 222 against the wrapping material and heating wire 224 causes the sides of the wrapping enclosure to partially encircle wire 224, thus exposing an area of said sides to heat from said wire. The heating wire 224 increases the temperature of the two parts of the wrapping sheet gripped between the two channels 221 and 223 and causes an auto weld; that is, causes the parts to be heat sealed to each other. This same operation of the approaching plates 191 and 212 causes the upper knife blade 189 and the lower knife blade 190 to shear past each other and to sever the wrapping material enveloping the packaged coins from the rest of the wrapping strip completing the forming of a wrapper 231 enclosing said coins. There is a slight, wasted end and a new cut end for the next operation. The relatively tight enclosure of the coin body and the pressure of the sealing means removes any temporary corrugation from wrapper 231 so that a smooth package results.

Pursuant to the invention, means are provided not only for enclosing and sealing the coins tightly by a circumferential wrapper, but also means are provided for enclosing the ends of the coin body, at least partially. For that reason, as particularly illustrated in FIGS. 13, 17, the tubes 111 and 112 are each connected by flexible conduits 226 and 227 to a source of air at high temperature. This air is fed into the tubes 111 and 112 and is permitted to escape from the ends thereof primarily through a plurality of apertures 228 and 229. The escaping hot air impinges upon the overhanging margins of wrapper 231, as shown in FIG. 17. It is a characteristic of this material that when heated it shrinks. While the package has been partially formed as shown in FIG. 16 and is still suspended in wrapper 231, the heat from the escaping hot air at the ends of the tubes 111 and 112 causes the end portions of the wrapper to shrink upon the ends of the coin body partially enclosing them, and preventing the escape of coins from the wrapper during the final operations.

When the wrapping operation has been completed, the cam 211 withdraws the bodies 192 and 213 and the gripping channels 221 and 223 are withdrawn from the flange 232. The wrapped coin body drops.

The dropping coin body is received upon a discharge conveyor belt 236. This is comprised of a central drive chain 237 (FIGS. 11, 20) trained around an appropriate drive sprocket 238 and an idler sprocket 239 and operating on stationary runners 241 and 242. The discharge belt is constructed with a number of evenly spaced, upstanding cleats 243 extending transversely across the runners 241 and 242 and defining intervening pockets 244, each of an appropriate size to receive a wrapped coin body.

The discharge belt is advanced intermittently. The drive sprocket 238 for the discharge belt, as shown in FIG. 20, is mounted on a cross shaft 245 on which a ratchet 246 is fixed. Journalled on the shaft 245 is a driven arm 247 carrying a pawl 248. A reach rod 249 is pivoted to the arm 247 and is similarly connected to an idler arm 251 on a support shaft 252 mounted in the frame of the machine. A driving rod 253 at one end is similarly pivoted to the arm 251 and at the other end is journalled on a crank 254. This is at the end of a crank shaft 256 disposed on the shaft 257 of a speed reducer 258 mounted on the frame 6.

An electric motor 259 mounted on the machine frame is connected by a chain 261 to the speed reducer 258 and drives the shaft 257. The speed reducer not only drives a chain 262 which extends to a sprocket 263 on the shaft 83 to drive other driven parts of the machine, but likewise revolves the crank shaft 257 at a reduced rate. As the shaft 257 revolves, the arm 251 is oscillated and the oscillation is transmitted to the pawl 248. In one direction the pawl engages the ratchet 246 and produces a corresponding partial rotation of the shaft 245 and so advances the discharge conveyor. The relationship is such that the discharge conveyor advances the space of one pocket 244 for each actuation. There is always a free pocket beneath the plates 191 and 212, when they retract, in position to receive the dropping wrapped coin body.

The conveyor 236 carries the wrapped coin bodies through a heated tunnel 265 (FIGS. 1, 11, 20), and thence to a convenient point of discharge. Heated tunnel 265 is mounted to the machine frame over conveyor 236, and is heated by any convenient heating means to a temperature sufficient to cause further shrinkage of wrapper 231. Such shrinkage tightens wrapper 231 until it fits the roll of coins snugly circumferentially and at its ends.

The final wrapper 231 is in general a circular cylindrical wrapping having a longitudinally extending, radially projecting fin 232 or flange comprised of two abutting and sealed thicknesses of the wrapping material. Also, at both ends, shrunk, inturned flanges 233 and 234 (FIGS. 18, 19) partially enclose and prevent endwise motion of the coin body. The transition between the flange 232 and the end flanges 233 and 234 is approximately as illustrated in FIG. 19. There is thus provided a body of coins completely encased, except for small holes at each end, in an appropriate wrapper.

Although a preferred form of the invention has been described and illustrated in detail, it is to be understood that modifications and design adaptations which would appear necessary or desirable to a person skilled in the art are within the spirit of the invention and the scope of the following claims.

We claim:
1. A coin packaging machine comprising a frame, a bottomless receiving hopper on said frame, a plurality of support rails mounted on said frame beneath said receiving hopper and parallel to each other in spaced apart planar arrangement, a plurality of orienting bars arranged in two groups, each of said orienting bars slidably resting on and being in vertical registry with a subjacent one of said support rails, means on said frame for reciprocating said two groups of orienting bars simultaneously and out of phase with each other, a conveyor belt mounted on said frame and disposed with the upper run of said conveyor belt underlying said plurality of support rails, and means on said frame for driving said upper run of said conveyor belt in one of the directions of reciprocation of said orienting bars.

2. A coin packaging machine comprising a frame, a bottomless receiving hopper on said frame, a plurality of support rails mounted on said frame beneath said receiving hopper and parallel to each other in a substantially horizontal planar arrangement with said support rails spaced apart slightly more than the thickness of coins to be packaged, a plurality of orienting bars arranged in at least two groups, each of said orienting bars slidably resting on and being in vertical registry with a subjacent one of said support rails, means on said frame for separately reciprocating each of said groups of orienting bars, and means on said frame substantially coextensive with said hopper and extending beneath said support rails to support coins disposed between said support rails and between said orienting bars.

3. A coin packaging machine as in claim 2 in which said means for separately reciprocating said orienting bars includes a drive shaft journalled on said frame, a plurality of eccentrics on said drive shaft, one for each of said groups of orienting bars, a plurality of cross bars, means for securing each of said cross bars to all of said orienting bars of an associated one of said groups, and means for connecting each of said eccentrics to a respective one of said cross bars to translate the rotation of said eccentrics with reciprocation of said cross bars.

4. A coin packaging machine comprising a frame, a plurality of orienting bars mounted on said frame for reciprocation, said bars being arranged in at least two groups and being disposed parallel to each other with spaces between adjacent bars slightly greater than the thickness of coins to be packaged, means on said frame extending beneath said spaces for supporting coins disposed in said spaces, a hopper on said frame disposed above said orienting bars and having sides and ends substantially contacting said orienting bars, and means on said frame for reciprocating said groups of orienting bars in different phase relationship to each other.

References Cited

UNITED STATES PATENTS

| | | | |
|---|---|---|---|
| 984,522 | 2/1911 | Altschul | 53—159 X |
| 1,424,534 | 8/1922 | Varga | 53—212 X |
| 1,516,902 | 11/1924 | Anderson et al. | 53—212 |
| 1,647,356 | 11/1927 | Hendry | 53—159 |
| 2,194,904 | 3/1940 | Jackson | 229—87.2 |
| 2,205,283 | 6/1940 | Downey | 229—87.2 |
| 2,225,888 | 12/1940 | Rose | 53—29 X |
| 2,480,368 | 8/1949 | Jackson | 229—87.2 |
| 2,709,880 | 6/1955 | Jorgensen | 53—159 X |
| 2,714,447 | 8/1955 | Gardes | 206—46 |
| 2,829,476 | 4/1958 | Engleson et al. | 53—159 |
| 2,878,628 | 3/1959 | Curry | 53—30 |
| 2,882,664 | 4/1959 | Reis | 53—212 |
| 2,912,102 | 11/1959 | Scott | 206—56 |
| 3,236,024 | 2/1966 | Bradley et al. | 53—229 X |
| 3,248,849 | 5/1966 | Hanson | 53—210 |

FOREIGN PATENTS

| | | |
|---|---|---|
| 51,196 | 1/1910 | Switzerland. |

TRAVIS S. McGEHEE, *Primary Examiner.*

FRANK E. BAILEY, G. O. RALSTON, *Examiners.*

L. S. BOUCHARD, W. T. DIXSON, R. L. FARRIS,
*Assistant Examiners.*